(12) United States Patent
Takatori et al.

(10) Patent No.: US 7,974,247 B2
(45) Date of Patent: Jul. 5, 2011

(54) COMMUNICATION TERMINAL DEVICE AND BILLING DEVICE

(75) Inventors: Sunao Takatori, Tokyo (JP); Hisanori Kiyomatsu, Tokyo (JP)

(73) Assignee: Daita Frontier Fund, LLC, Wilmington, DE (US)

( * ) Notice: Subject to any disclaimer, the term of this patent is extended or adjusted under 35 U.S.C. 154(b) by 1718 days.

(21) Appl. No.: 10/054,038

(22) Filed: Nov. 12, 2001

(65) Prior Publication Data

US 2002/0077981 A1    Jun. 20, 2002

(30) Foreign Application Priority Data

Nov. 13, 2000   (JP) .................................. 2000-344671

(51) Int. Cl.
H04W 4/00   (2009.01)
H04L 12/26   (2006.01)
H04B 7/00   (2006.01)

(52) U.S. Cl. ........ 370/338; 370/252; 370/342; 370/392; 370/468; 370/477; 455/422.1; 455/500; 455/506

(58) Field of Classification Search ............... 370/230.1, 370/395.4, 395.21, 228–503; 455/422.1, 455/503, 507
See application file for complete search history.

(56) References Cited

U.S. PATENT DOCUMENTS

| | | | | |
|---|---|---|---|---|
| 4,691,314 A | * | 9/1987 | Bergins et al. ................. | 370/471 |
| 4,839,891 A | * | 6/1989 | Kobayashi et al. ............ | 370/231 |
| 4,890,321 A | * | 12/1989 | Seth-Smith et al. .......... | 380/231 |
| 4,977,582 A | * | 12/1990 | Nichols et al. ................. | 375/371 |
| 5,029,164 A | * | 7/1991 | Goldstein et al. ............. | 370/235 |
| 5,191,583 A | * | 3/1993 | Pearson et al. ................ | 370/242 |
| 5,404,374 A | * | 4/1995 | Mullins et al. ................ | 375/133 |
| 5,446,735 A | * | 8/1995 | Tobagi et al. .................. | 370/445 |
| 5,528,621 A | * | 6/1996 | Heiman et al. ................ | 375/133 |
| 5,668,803 A | * | 9/1997 | Tymes et al. .................. | 370/312 |
| 5,680,400 A | * | 10/1997 | York ............................. | 370/473 |
| 5,790,173 A | * | 8/1998 | Strauss et al. ................. | 725/114 |
| 5,892,753 A | * | 4/1999 | Badt et al. ..................... | 370/233 |
| 5,931,961 A | * | 8/1999 | Ranganathan et al. ........ | 714/712 |
| 6,038,216 A | * | 3/2000 | Packer .......................... | 370/231 |

(Continued)

FOREIGN PATENT DOCUMENTS

JP        63-131635        6/1988

(Continued)

OTHER PUBLICATIONS

English language abstract of Japanese Patent Publication No. 63-131635 titled "LAN Control Equipment," 1 page.

(Continued)

*Primary Examiner* — Ayaz R Sheikh
*Assistant Examiner* — Venkatesh Haliyur
(74) *Attorney, Agent, or Firm* — Sterne, Kessler, Goldstein & Fox, P.L.L.C.

(57) ABSTRACT

For transmitting transmission data generated by a transmission data generator of a communication terminal device, a packet unit determining unit [17] determines a packet unit for a lowest data communication rate for the transmission of the transmission data, among packet units (packet sizes) that can be recognized by a destination communication terminal device and that can be transmitted from the communication terminal device. A packet generator [18] packetizes the transmission data according to the packet unit determined by the packet unit determining unit [17], and transmits the packetized transmission data to the destination communication terminal device.

16 Claims, 3 Drawing Sheets

U.S. PATENT DOCUMENTS

| | | | |
|---|---|---|---|
| 6,046,985 A * | 4/2000 | Aldred et al. | 370/252 |
| 6,085,253 A * | 7/2000 | Blackwell et al. | 709/235 |
| 6,094,423 A * | 7/2000 | Alfano et al. | 370/310 |
| 6,134,243 A | 10/2000 | Jones et al. | 370/465 |
| 6,230,190 B1 * | 5/2001 | Edmonds et al. | 709/213 |
| 6,243,676 B1 * | 6/2001 | Witteman | 704/243 |
| 6,252,544 B1 * | 6/2001 | Hoffberg | 342/357.1 |
| 6,269,080 B1 * | 7/2001 | Kumar | 370/236 |
| 6,301,621 B1 * | 10/2001 | Haverstock et al. | 709/246 |
| 6,307,867 B1 * | 10/2001 | Roobol et al. | 370/470 |
| 6,356,937 B1 * | 3/2002 | Montville et al. | 709/206 |
| 6,389,489 B1 * | 5/2002 | Stone et al. | 710/57 |
| 6,397,055 B1 * | 5/2002 | McHenry et al. | 455/408 |
| 6,397,345 B1 * | 5/2002 | Edmonds et al. | 714/4 |
| 6,412,079 B1 * | 6/2002 | Edmonds et al. | 714/11 |
| 6,452,915 B1 * | 9/2002 | Jorgensen | 370/338 |
| 6,493,316 B1 * | 12/2002 | Chapman et al. | 370/231 |
| 6,516,435 B1 * | 2/2003 | Tsunoda | 714/751 |
| 6,522,628 B1 * | 2/2003 | Patel et al. | 370/230.1 |
| 6,542,490 B1 * | 4/2003 | Ahmadvand et al. | 370/338 |
| 6,546,238 B1 * | 4/2003 | Nightingale et al. | 455/406 |
| 6,556,818 B1 * | 4/2003 | Meehan | 455/406 |
| 6,567,375 B2 * | 5/2003 | Balachandran et al. | 370/204 |
| 6,570,855 B1 | 5/2003 | Kung et al. | |
| 6,574,213 B1 * | 6/2003 | Anandakumar et al. | 370/349 |
| 6,590,885 B1 * | 7/2003 | Jorgensen | 370/338 |
| 6,594,246 B1 * | 7/2003 | Jorgensen | 370/338 |
| 6,628,629 B1 * | 9/2003 | Jorgensen | 370/322 |
| 6,640,248 B1 * | 10/2003 | Jorgensen | 709/226 |
| 6,680,922 B1 * | 1/2004 | Jorgensen | 370/328 |
| 6,728,263 B2 * | 4/2004 | Joy et al. | 370/468 |
| 6,768,722 B1 | 7/2004 | Katseff et al. | |
| 6,778,545 B1 * | 8/2004 | Moataghed | 370/413 |
| 6,839,322 B1 * | 1/2005 | Ashwood | 370/235 |
| 6,862,622 B2 * | 3/2005 | Jorgensen | 709/226 |
| 6,888,796 B2 * | 5/2005 | Iizuka | 370/232 |
| 6,965,943 B1 * | 11/2005 | Golestani | 709/235 |
| 7,012,893 B2 * | 3/2006 | Bahadiroglu | 370/231 |
| 7,035,214 B1 * | 4/2006 | Seddigh et al. | 370/231 |
| 7,035,916 B1 * | 4/2006 | Backman et al. | 709/220 |
| 7,190,260 B2 * | 3/2007 | Rast | 340/479 |
| 7,194,554 B1 * | 3/2007 | Short et al. | 709/246 |
| 7,243,160 B2 * | 7/2007 | Brahmaroutu | 709/238 |
| 7,305,486 B2 * | 12/2007 | Ghose et al. | 709/232 |
| 7,369,498 B1 * | 5/2008 | Ma et al. | 370/235 |
| 7,457,242 B2 * | 11/2008 | Beightol et al. | 370/230 |
| 7,519,018 B2 * | 4/2009 | Kwak | 370/320 |
| 7,764,661 B2 * | 7/2010 | Heo et al. | 370/342 |
| 2002/0099632 A1 * | 7/2002 | Yanagidate et al. | 705/34 |
| 2007/0244814 A1 | 10/2007 | Takatori et al. | |

FOREIGN PATENT DOCUMENTS

| | | |
|---|---|---|
| JP | H09-055718 | 2/1997 |
| JP | 2000-209200 | 7/2000 |

OTHER PUBLICATIONS

English language abstract of Japanese Patent Publication No. H09-055718 titled "Data Communication Device," 1 page.

English language abstract of Japanese Patent Publication No. 2000-209200 titled "Packet Charging System," 1 page.

Non-Final Office Action, mailed May 11, 2009, for U.S. Appl. No. 11/696,498, filed Apr. 4, 2007, 12 pgs.

* cited by examiner

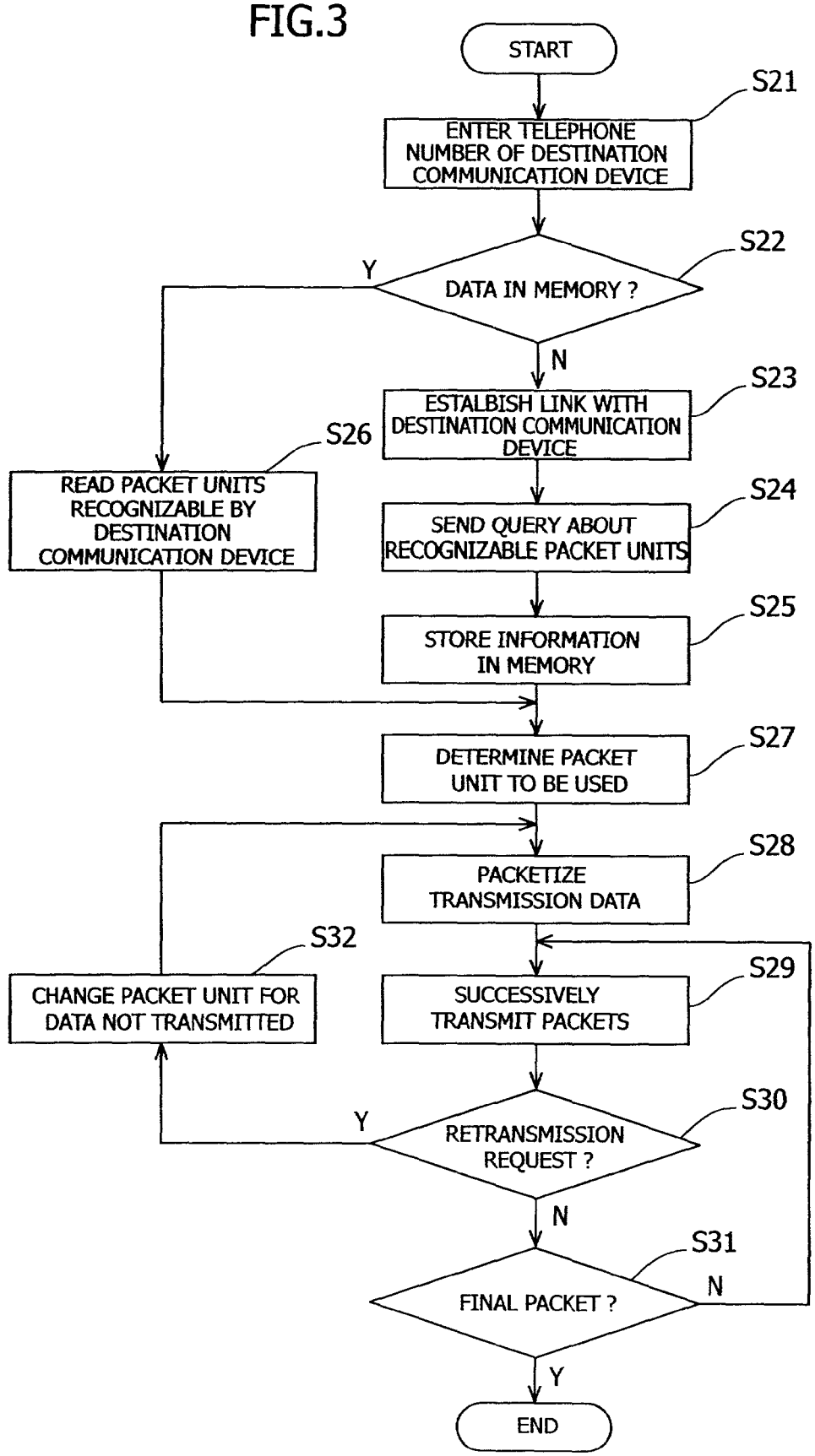

FIG.4

| ID OF COMMUNICATION TERMINAL (TELEPHONE NUMBER) |
|---|
| ID OF COMMUNICATION TERMINAL TO BE BILLED (TELEPHONE NUMBER) |
| BILLING ACCOUNT NO. |
| DESTINATION ID (TELEPHONE NUMBER) |
| PACKET UNITS   NUMBER OF PACKETS   DATA COMMUNICATION RATES |
| 128 bytes    X PACKETS    X × ( UNIT PRICE OF PACKET ) |
| 384 bytes    Y PACKETS    Y × ( UNIT PRICE OF PACKET ) |
| DATE OF START OF TRANSMISSION     YYYY / MM / DD  \*\*/\*\* |
| DATA OF END OF TRANSMISSION     YYYY / MM / DD  \*\*/\*\* |
| COMMUNICATION TERMINAL LOCATION (GPS COORDINATES OR INFORMATION REQUIRED TO IDENTIFY LOCATION) |
| STATUS OF TRANSMISSION     GOOD |
| DESTINATION ID (TELEPHONE NUMBER) |
| PACKET UNITS   NUMBER OF PACKETS   DATA COMMUNICATION RATES |
| 768 bytes    Z PACKETS    Z × ( UNIT PRICE OF PACKET ) |
| DATE OF START OF TRANSMISSION     YYYY / MM / DD  \*\*/\*\* |
| DATA OF END OF TRANSMISSION     YYYY / MM / DD  \*\*/\*\* |
| COMMUNICATION TERMINAL LOCATION (GPS COORDINATES OR INFORMATION REQUIRED TO IDENTIFY LOCATION) |
| STATUS OF TRANSMISSION     GOOD |

COMMUNICATION TERMINAL DEVICE AND BILLING DEVICE

BACKGROUND OF THE INVENTION

1. Field of the invention The present invention relates to a communication terminal device and a billing device in a packet communication system.

2. Description of the Related Art

Presently, it is customary for communications carriers which provide Internet connection services using portable telephone sets to charge users based on the number of packets of data that are transmitted and received. Each packet includes a header containing control information representative of a source, a destination, and a sequence of packets, etc. If the size of a packet, i.e., the amount of transmission data (hereinafter referred to as "packet unit") included in a packet is reduced, then the data transmitted and received per packet is relatively reduced, making the transmission and reception of data inefficient.

Conversely, if the size of a packet unit is increased, then even when a small amount of data is transmitted and received, the user is charged with a rate for the transmitted and received data based on the large packet unit.

SUMMARY OF THE INVENTION

It is therefore an object of the present invention to provide a communication terminal device and a billing device which can packetize transmission data with the most appropriate packet unit and transmit the packetized transmission data for effective use of communications circuits, so as to reduce data communication charges users have to pay.

In order to achieve the above object, there is provided in accordance with the present invention a communication terminal device comprising a packet unit determining unit for determining an appropriate packet unit for transmission data to be packetized, and a packet generator for packetizing the transmission data based on a packet unit determined by the packet unit determining unit.

The packet unit determining unit comprises means for determining the appropriate packet unit based on packet units that can be transmitted by the communication terminal device and packet units that can be recognized by a destination communication terminal device.

The communication terminal device further comprises at least one of means for transmitting a query about packet units that can be recognized by a destination communication terminal device to the destination communication terminal device, and means for responding to a query about packet units that can be transmitted by the communication terminal device from the destination communication terminal device.

The communication terminal device further comprises means for storing information with respect to the packet units that can be recognized by the destination communication terminal device.

The communication terminal device further comprises means for, if a retransmission request occurs while packets are being transmitted, transmitting data subsequent to the retransmission request according to a smaller packet unit.

According to the present invention, there is also provided a billing device comprising means for generating a billing file storing information for billing which includes the type of a transmitted packet unit, the number of transmitted packets, and a packet communication rate, with respect to an identification (ID) to be billed, and means for generating a charging file for the ID to be billed for a predetermined period.

BRIEF DESCRIPTION OF THE DRAWINGS

FIG. 3 is a flowchart of an operation sequence of the communication terminal device for transmitting packets; and FIG. 4 is a diagram showing, by way of example, a billing file used in the packet communication system.

DETAILED DESCRIPTION OF THE PREFERRED EMBODIMENT

A communication terminal device according to the present invention is applicable to both mobile communication systems and fixed communication systems. In the illustrated embodiment, the communication terminal device according to the present invention is shown as being applied to a mobile packet communication system.

Figure 1:
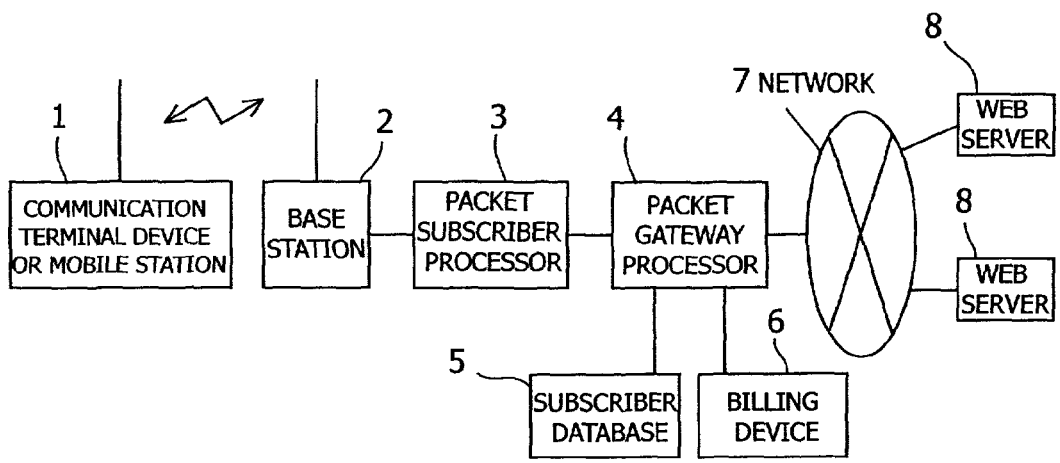
FIG. 1 is a block diagram of a packet communication system incorporating the principles of the present invention.

FIG. 1 shows in block diagram a packet communication system incorporating a communication terminal device and a billing device according to the present invention.

As shown in FIG. 1, the packet communication system includes a mobile communication terminal device 1, a base station 2 that can be connected to the communication terminal device 1, a packet subscriber processor 3 for controlling the transfer of user packets, managing the positions of mobile stations, and controlling an authentication process, a packet gateway processor 4 for connecting to a network such as the Internet and performing various processing sequences, a subscriber database 5 connected to the packet gateway processor 4, a billing device 6 connected to the packet gateway processor 4, a network 7 such as the Internet, and various servers 8 such as Web servers connected to the network 7.

The packet communication system thus constructed operates as follows: For transmitting data packets from the communication terminal device 1, the communication terminal device 1 attempts to register a packet communication process in the packet subscriber processor 3 via the base station 2. In response to a registration request from the communication terminal device 1, the packet subscriber processor 3 accesses the subscriber database 5 via the packet gateway processor 4, authenticates the user, and connects a link to the communication terminal device 1. The packet subscriber processor 3 then transmits a packet communication registration response to the communication terminal device 1, and transmits and receives packets.

When packets have arrived from the network 7, the packet gateway processor 4 acquires subscriber information and terminal location information of the communication terminal device 1 from the IP address of the received packets, and transfers the packets to the packet subscriber processor 3 of an area where the communication terminal device 1 is located. The packets are then transferred from the packet subscriber processor 3 via the base station 2 to the communication terminal device 1.

Figure 2:
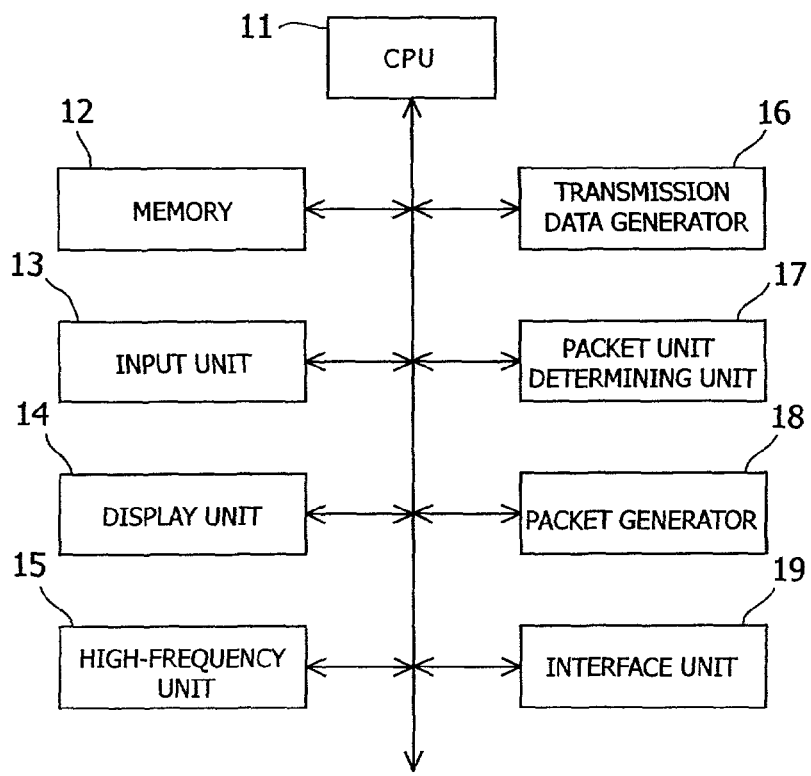
FIG. 2 is a block diagram of a communication terminal device according to the present invention.

According to the present invention, the communication terminal device 1 is arranged to be able to select and transmit a packet unit to be transmitted, i.e., an amount of transmission data per packet. FIG. 2 shows in block diagram the communication terminal device 1 according to the present invention.

As shown in FIG. 2, the communication terminal device 1 has a central processing unit (CPU) 11 for controlling overall operation of the communication terminal device 1, a memory 12 for storing a control program and various data, the memory 12 being also used as a working area, an input unit 13, a display unit 14, a high-frequency unit 15 for transmitting and receiving radio signals, a transmission data generator 16 for generating transmission data, a packet unit determining unit 17 for determining which packet unit is to be selected for transmitting packets, a packet generator 18 for generating a packet signal according to the packet unit determined by the packet unit determining unit 17, and an interface unit 19 for inputting data from and outputting data to an external device.

For transmitting packet data using the communication terminal device 1 thus constructed, the communication terminal device 1 is capable of selecting and transmitting a packet unit having an amount of data that is most appropriate for the data to be transmitted.

A process of selecting a packet unit will be described below with reference to FIG. 3. It is assumed that before this process is carried out, the user of the communication terminal device 1 has generated transmission data using the transmission data generator 16 based on data entered from the input unit 13 or data entered from the external device connected to the communication terminal device 1 via the interface unit 19.

For transmitting the data, the user enters the telephone number of a destination communication device in step S21. The destination communication device may be a portable communication terminal identical to the communication terminal device 1 or a fixed communication device.

Based on the entered telephone number, the CPU 11 determines whether information relative to packet units that can be recognized by the destination communication device is stored in the memory 12 or not in step S22. If not stored in the memory 12, then control goes to step S23 to establish a communication link between the communication terminal device 1 and the destination communication device. Then, the CPU 11 sends a query to the destination communication device about packet units that can be recognized by the destination communication device in step S24. The CPU 11 receives information about packet units that can be recognized by the destination communication device and stores the received information in the memory 12 in step S25. If information relative to packet units that can be recognized by the destination communication device is stored in the memory 12 in step S21, then control proceeds to step S26 in which the CPU 11 reads the information from the memory 12.

After the CPU 11 acquires the information about packet units that can be recognized by the destination communication device in step S24 or S26, control goes to step S27 in which the packet unit determining unit 17 determines a packet unit to be used for transmitting the transmission data. Specifically, the packet unit determining unit 17 selects packet units that can be transmitted by the communication terminal device 1 from those packet units that can be recognized by the destination communication device, and determines a packet unit among the selected packet units which reduces the amount of transmission data to a minimum level upon transmission of the transmission data, in view of data communication rates for the respective packet units. The packet unit determining unit 17 determines a packet unit based on an amount of actual transmission data exclusive of an amount of control data per packet. If a large packet unit is selected, then a communication error may occur depending on the communication circumstances, resulting in an increased charge for data communications. Depending on the communication speed, a large packet unit that is selected may cause a communication delay. Therefore, the status of received radio waves and the traffic congestion may also be used as a basis for determining a packet unit. The packet unit determining unit 17 may represent selectable packet units to the user, and the user may select a desired packet units from the selectable packet units.

After the packet unit determining unit 17 determines a packet unit optimum for the transmission data, control goes to step S28 in which the packet generator 18 packetizes the transmission data according to the determined packet unit. In step S29, the generated packets are successively transmitted from the communication terminal device 1 to the destination communication device. If the answer to step S22 is YES and the processing in step S26 is carried out, then a communication link to the destination communication device is established in step S29, and then the generated packets are successively transmitted from the communication terminal device 1 to the destination communication device. Thereafter, if a retransmission request due to a communication error does not occur (the answer to step S30 is NO) and the transmission data can be transmitted until the final packet (the answer to step S31 is YES), then the transmission of the transmission data is put to an end.

If a retransmission request due to a communication error occurs (the answer to step S30 is YES), then control goes to step S32 in which the packet unit determining unit 17 changes the packet unit to a smaller packet unit for use in the transmission of the transmission data. Thereafter, control goes back to step S28 in which the packet generator 18 packetizes the transmission data according to the smaller packet unit. Then, the generated packets are successively transmitted from the communication terminal device 1 to the destination communication device.

As described above, the communication terminal device according to the present invention determines an optimum packet unit among those packet units that can be recognized by both the user's communication terminal device and the destination communication terminal device and transmits the transmission data according to the determined packet unit. Therefore, the link established between the user's communication terminal device and the destination communication terminal device can effectively be utilized, and the burden on the user for data communication charges can be reduced.

Since the information about packet units that can be recognized by the destination communication terminal device is stored in the memory 12, it is possible to reduce the frequency of queries about packet units that can be recognized by the destination communication device.

When a retransmission request occurs, the presently determined packet unit is changed to a smaller packet unit, and the transmission data is transmitted according to the smaller packet unit. Accordingly, the burden on the overall packet communication system can be reduced.

A billing process carried out in the packet communication system which incorporates the above communication terminal device will be described below.

Packet units that can be transmitted and received are set in the billing device 6 which is connected to the packet gateway processor 4, and packet communication rates are established according to those packet units.

At present, 128 bytes are handled as one packet, and a packet communication rate per packet is 0.25 cents (0.3 yen). According to the present invention, the following packet communication rates are established:

128 bytes/1 packet: 0.09 cents (0.1 yen)
384 bytes/1 packet: 0.25 cents (0.3 yen)
...
1280 bytes/1 packet: 0.9 cents (1 yen)

Based on the information from the packet gateway processor 4, the billing device 6 determines the packet unit of the packetized data transmitted from the communication terminal device 1 and calculates the number packets of the packetized data, and generates a billing file.

FIG. 4 shows the billing file by way of example. As shown in FIG. 4, the billing file stores the ID of a communication terminal device, the ID of a communication terminal device to be billed, the ID of a destination communication terminal device in each packet transmitting process, information representing the types of packet units and the numbers of packets, a data communication rate produced by multiplying packet communication rates, the dates when the data transmission starts and ends, the location of the communication terminal device, and the status of transmission.

The billing device 6 defines a desired period, and generates a charging file for the ID of each communication terminal device to be billed from the charging file for the period.

The billing device 6 then transmits an e-mail message containing the charging file to the communication terminal device of the owner represented by the ID, or prints the charging file which will be sent by a postal service to the owner represented by the ID. At the same time, the billing device 6 withdraws a charged amount of money from a bank account that belongs to the ID of the communication terminal device to be billed.

By thus generating a billing file storing information necessary for billing, such as the number of packets for each packet unit and packet communication rates, it is possible to bill the user of a communication terminal device for packet communications using the communication terminal device.

In the above embodiment, the mobile communication terminal device has been described by way of example. However, the principles of the present are also applicable to a fixed communication terminal device.

As described above, the communication terminal device and the billing device according to the present invention allow the user to transmit and receive data according to an appropriate packet unit, and achieve data communications are carried out according to an appropriate packet unit for effectively utilizing limited frequency resources.

Since the communication terminal device according to the present invention is capable of storing packet units that can be recognized by the destination communication terminal device, the frequency of queries about packet units that can be recognized by the destination communication device is reduced, resulting in a reduction in the traffic.

In the event of the occurrence of a retransmission request, the communication terminal device according to the present invention changes the present packet unit to a smaller packet unit and transmits data according to the smaller packet unit. Therefore, the burden on the overall packet communication system can be reduced.

What is claimed is:

1. A wireless communications device comprising:
   a transmitter configured to transmit a query to a destination communication device, the query being about packet sizes that are recognizable by the destination communication device;
   a receiver configured to receive a response to the query from the destination communication device, the response indicating the packet sizes that are recognizable by the destination communication device;
   a determining device configured to select an appropriate packet size for transmission data to be packetized, the appropriate packet size being selected according to:
      data communication rates for packets previously transmitted to the destination communication device;
      the response indicating the packet sizes that are recognizable by the destination communication device;
      packet sizes among the packet sizes that are recognizable by the destination communication device that can be transmitted by the wireless communication device; and
      a retransmission request that occurs in response to detecting a communication error or traffic congestion on a communication link established between the wireless communications device and the destination communication device, the retransmission request occurring while packets are being transmitted, wherein the appropriate packet size is smaller than the packet sizes that are recognizable by the destination communication device and sizes of packets previously transmitted to the destination communication device; and
   a packet generator configured to packetize the transmission data based on the appropriate packet size determined by the determining device.

2. The wireless communications device according to claim 1, further comprising:
   a storage device configured to store information with respect to the packet sizes that are recognizable by the destination communication device.

3. A method for determining packet sizes for transmission data to be packetized and transmitted from a communication terminal device to a destination communication device, the method comprising:
   transmitting a query to the destination communication device, the query being about packet sizes that are recognizable by the destination communication device;
   receiving a response to the query from the destination communication device, the response indicating the packet sizes that are recognizable by the destination communication device;
   selecting an appropriate packet size for transmission data to be packetized, the appropriate packet size being selected according to:
      data communication rates for packets previously transmitted to the destination communication device;
      the response indicating the packet sizes that are recognizable by the destination communication device;
      packet sizes among the packet sizes that are recognizable by the destination communication device that can be transmitted by the wireless communication device; and
      a retransmission request that occurs in response to detecting a communication error or traffic congestion on a communication established between the communication terminal device and the destination communication device, the retransmission request occurring while packets are being transmitted, wherein the appropriate packet size is smaller than the packet sizes that are recognizable by the destination communication device and sizes of the packets previously transmitted to the destination communication device; and
   packetizing the transmission data according to the appropriate packet size selected.

4. The method according to claim 3, further comprising transmitting the packetized transmission data from the communication terminal device to the destination communication device.

5. The method according to claim 3, further comprising determining whether information regarding the packet sizes recognizable by the destination communication device is stored in a memory of the communication terminal device.

6. The method according to claim 4, further comprising:
receiving, after the transmitting, a retransmission request requesting a different packet size that reduces the amount of transmission data based upon the data communication rates for packets previously transmitted to the destination communication device;
repacketizing the transmission data into a different packet size according to the retransmission request; and
transmitting the repacketized transmission data to the destination communication device.

7. An article of manufacture including a non-transitory computer-readable medium encoded with instructions, execution of which by a computing device cause the computing device to perform operations comprising:
transmitting a query to a destination communication device, the query directed to packet sizes that are recognizable by the destination communication device;
receiving a response to the query from the destination communication device, the response indicating the packet sizes that are recognizable by the destination communication device;
selecting an appropriate packet size for transmission data to be packetized, the appropriate packet size being selected according to:
data communication rates for packets previously transmitted to the destination communication device;
the response indicating the packet sizes that are recognizable by the destination communication device;
packet sizes among the packet sizes that are recognizable by the destination communication device that can be transmitted by the wireless communication device; and
a retransmission request that occurs in response to detecting a communication error or traffic congestion on a communication link established between the computing device and the destination communication device, the retransmission request occurring while packets are being transmitted, wherein the appropriate packet size is smaller than the packet sizes that are recognizable by the destination communication device and sizes of the packets previously transmitted to the destination communication device; and
packetizing the transmission data according to the appropriate packet size selected.

8. The article of manufacture according to claim 7, the operations further comprising:
transmitting the packetized transmission data to the destination communication device.

9. The article of manufacture according to claim 8, the operations further comprising:
receiving, after the transmitting, a retransmission request requesting a different packet size that reduces the amount of transmission data based upon the data communication rates for packets previously transmitted to the destination communication device;
repacketizing the transmission data into a different packet size according to the retransmission request; and
transmitting the repacketized transmission data to the destination communication device.

10. The article of manufacture according to claim 7, the operations further comprising:
determining whether information regarding the packet sizes recognizable by the destination communication device is stored in a memory.

11. A communication terminal device configured to determine packet sizes for transmission data to be packetized and transmitted to a destination communication device, the communication terminal device comprising:
a transmitter configured to transmit a query to the destination communication device, the query being about packet sizes that are recognizable by the destination communication device;
means for receiving a response to the query from the destination communication device, the response indicating packet sizes that are recognizable by the destination communication device;
means for selecting an appropriate packet size for transmission data to be packetized, the appropriate packet size being selected according to:
data communication rates for packets previously transmitted to the destination communication device;
the response indicating the packet sizes that are recognizable by the destination communication device;
packet sizes among the packet sizes that are recognizable by the destination communication device that can be transmitted by the wireless communication device; and
a retransmission request that occurs in response to detecting a communication error or traffic congestion on a communication link established between the communication terminal device and the destination communication device occurring while packets are being transmitted, wherein the appropriate packet size is smaller than the packet sizes that are recognizable by the destination communication device and sizes of the packets previously transmitted to the destination communication device; and
means for packetizing the transmission data according to the appropriate packet size selected.

12. The communication terminal device of claim 11, further comprising:
means for storing information with respect to the packet sizes that are recognizable by the destination communication device.

13. The wireless communication device according to claim 1, wherein the determining device is configured to perform the selecting of the appropriate packet size according to one or more of a status of transmission data received by the wireless communications device or current traffic congestion of a communication link that the transmission data is to be transmitted over.

14. The method according to claim 3, wherein the selecting the appropriate packet size comprises selecting according to one or more of a status of transmission data received by the communication terminal device or current traffic congestion of a communication link that the transmission data is to be transmitted over.

15. The article of manufacture according to claim 7, wherein the selecting the appropriate packet size comprises selecting according to one or more of a status of transmission data received by the computing device or current traffic congestion of a communication link that the transmission data is to be transmitted over.

16. The communication terminal device of claim 11, wherein the means for selecting the appropriate packet size selects according to one or more of a status of transmission data received by the computing device or current traffic congestion of a communication link that the transmission data is to be transmitted over.

* * * * *

UNITED STATES PATENT AND TRADEMARK OFFICE
CERTIFICATE OF CORRECTION

| | | |
|---|---|---|
| PATENT NO. | : 7,974,247 B2 | Page 1 of 1 |
| APPLICATION NO. | : 10/054038 | |
| DATED | : July 5, 2011 | |
| INVENTOR(S) | : Takatori et al. | |

It is certified that error appears in the above-identified patent and that said Letters Patent is hereby corrected as shown below:

Title page, item [57] under "Abstract", in Column 2, Line 3, delete "unit [17] determines" and insert -- unit determines --.

Title page, item [57] under "Abstract", in Column 2, Line 8, delete "generator [18] packetizes" and insert -- generator packetizes --.

Title page, item [57] under "Abstract", in Column 2, Line 10, delete "unit [17], and" and insert -- unit, and --.

Column 8, Line 42, in Claim 13, delete "wireless communication" and insert -- wireless communications --.

Signed and Sealed this
Twenty-sixth Day of June, 2012

David J. Kappos
*Director of the United States Patent and Trademark Office*